United States Patent [19]

Snyder

[11] Patent Number: 4,646,521

[45] Date of Patent: Mar. 3, 1987

[54] HYDROVERSION

[76] Inventor: Wayne Snyder, 501 Orchard St., Dowagiac, Mich. 49047

[21] Appl. No.: 605,482

[22] Filed: Apr. 30, 1984

[51] Int. Cl.⁴ ............................................. F16D 39/00
[52] U.S. Cl. ...................................................... 60/491
[58] Field of Search ................. 60/491, 490, 487, 492; 418/22, 28, 173, 175, 177

[56] References Cited

U.S. PATENT DOCUMENTS

| | | | |
|---|---|---|---|
| 2,220,636 | 11/1940 | Bischof | 60/487 |
| 2,502,546 | 4/1950 | Adams | 417/222 X |
| 2,788,636 | 4/1957 | Badalini | 60/492 |
| 2,927,430 | 3/1960 | Castles, Jr. | 60/491 |
| 3,161,023 | 12/1964 | Margolin et al. | 60/492 X |
| 3,984,946 | 10/1976 | Waters | 418/175 X |
| 4,008,982 | 2/1977 | Traut | 60/491 X |
| 4,109,466 | 8/1978 | Keech | 60/491 X |
| 4,175,389 | 11/1979 | Shiber | 60/490 X |

FOREIGN PATENT DOCUMENTS 792944  4/1958  United Kingdom ................ 418/28

Primary Examiner—Edward K. Look

[57] ABSTRACT

A continuously variable hydraulic transmission composed of two variable displacement rotary vane pumps. Where the inner rotor of one pump is driven by the input shaft and the inner rotor of the other pump is held stationary by the supporting framework, both inner rotors sharing a common housing unit which rotates as the output shaft, and moves axially over the inner rotors to achieve inversely variable capacities of the two pumps and there-by varying the drive ratios between the input and output shafts. Two end plates are used, each of which rotates with its respective rotor and also moves axially with the housing unit to facilitate the variableness of the two pumps. A separating plate is incorporated between the rotors and rotates with the housing unit to maintain proper fluid pressure containment.

1 Claim, 9 Drawing Figures

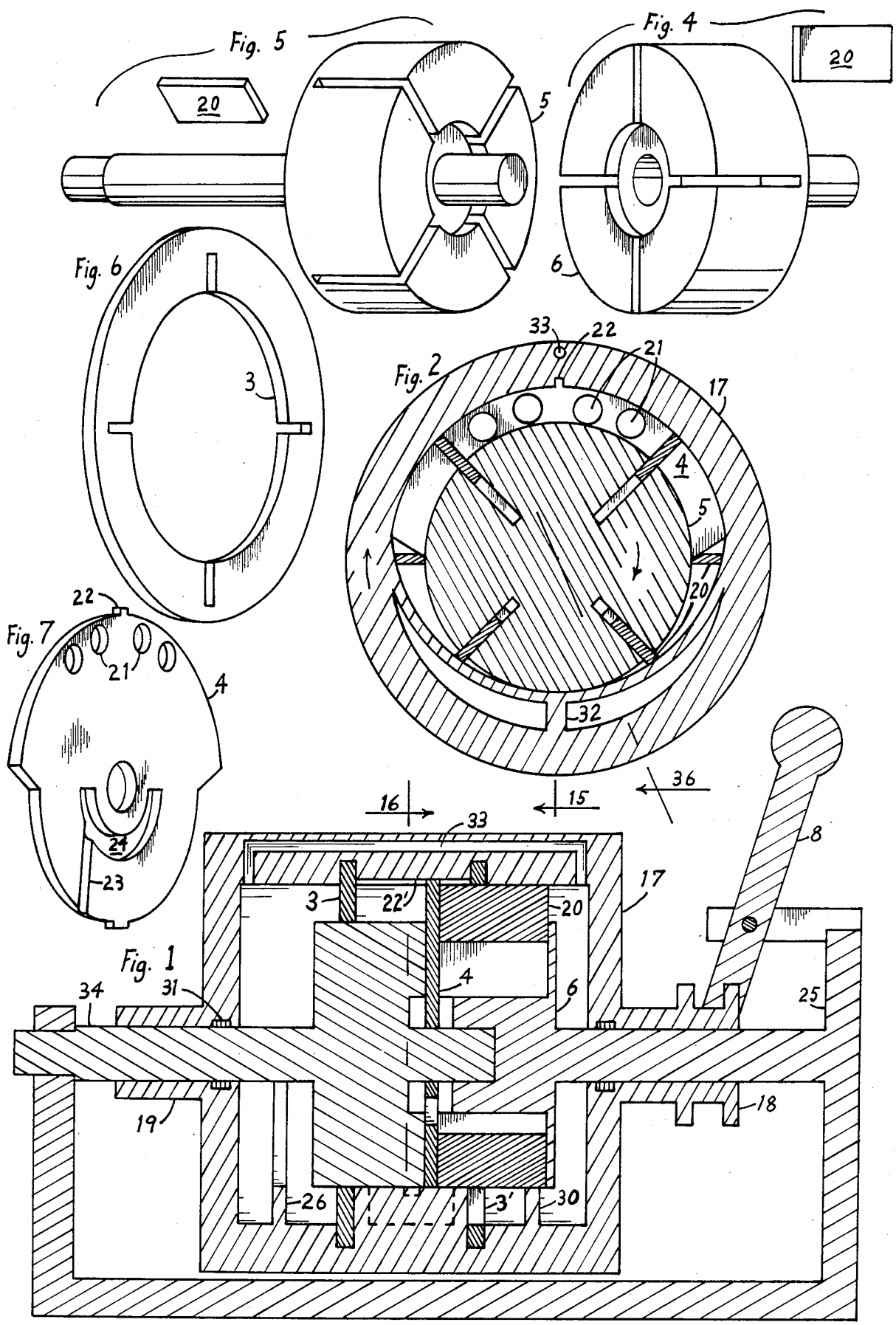

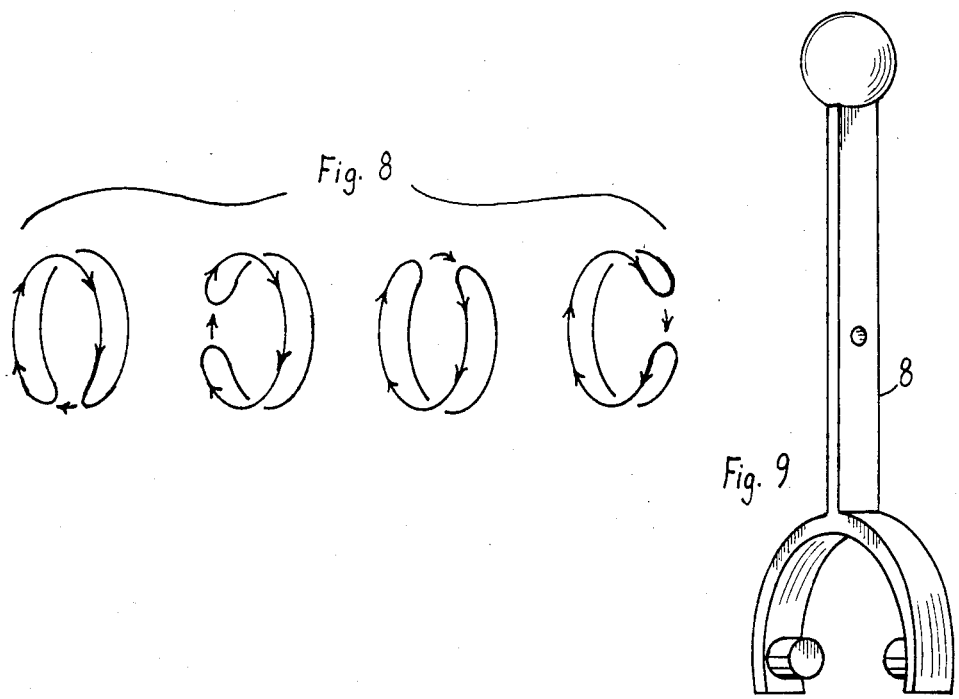
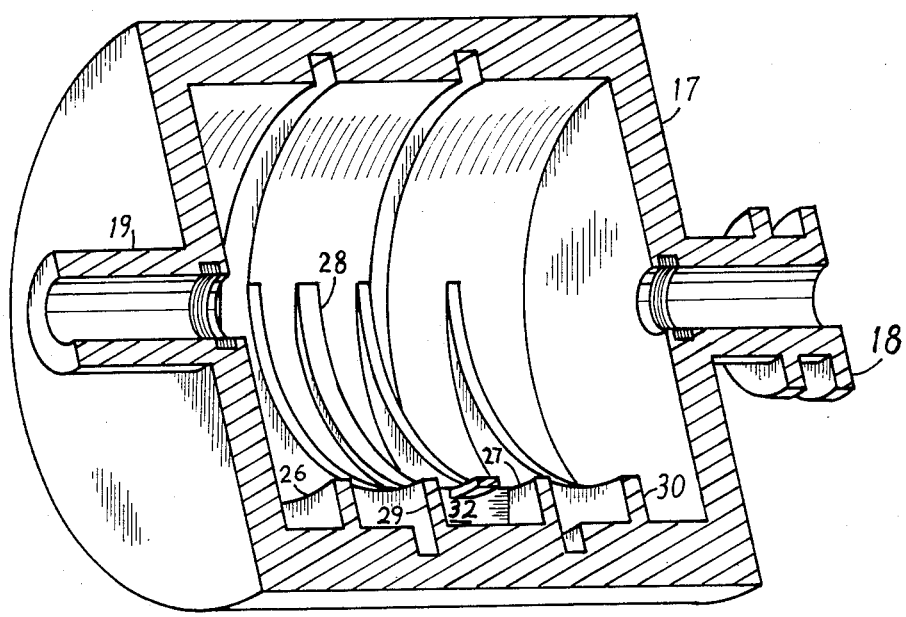

HYDROVERSION

CROSS REFERENCES TO RELATED APPLICATIONS

This variable hydraulic transmission can be used for the transmission of power in automobiles, trucks, tractors, or any other machinery which utilizes different ratios of torque transmission.

BACKGROUND OF INVENTION

In the past there has been invented and patented several different forms of continuously variable hydraulic transmissions which uitilize the basic principle of hydraulic action used in this invention. Specifically; Margolin, U.S. Pat. No. 3,161,023–12/64; Shiber, U.S. Pat. No. 4,175,389–11/79; & Bischof, U.S. Pat. No. 2,220,636—11/40.

But these earlier designs have been quite inefficient because of the pumps used and the fluid flow between the pumps. And they have been rather impractical because of their overall complexities of mechanical parts. My invention is designed to overcome these deficiencies.

SUMMARY OF INVENTION

My invention is a form of rotary pump & motor hydraulic transmission used to obtain infinitely variable drive ratios, from a 1 to 1 ratio to an infinity to 1 ratio.

My invention uses two rotary vane pumps which are both of variable capacities. Their capacities vary simultaneously but inversly with each other. They both have a common housing unit which is axially slidable to facilitate the variance of the pumps capacities. This housing unit also rotates and comprises the output shaft. The two pumps are arranged in line with each other and are only seperated by a thin seperating plate which does not interfere with the flow of fluids from the cavities of one pump to the other. This unrestricted fluid flow combined with the natural efficiency of the rotary vane pumps makes this invention efficient enough to be of practical use in automobiles.

Another advantage of this design is that it incorporates a lock-up mode of torque transmission while in the 1 to 1 drive ratio, at which time no fluid is being pumped and no mechanical energy is being wasted. This 1 to 1 drive ratio is what is used most of the time in automobiles and so makes this invention advantageous for use in automobiles.

Another advantage of my invention is the simplicity of its parts. As can be seen in the included drawings, there are very few moving parts and no gears used in this elemetary design, (no reverse drive is included).

Another advantage of my invention is that for its size it has a relatively large amount of pump displacement and working surfaces for heavy loads and so can be built relatively small and compact.

BRIEF DESCRIPTION OF DRAWINGS

Two sheets of drawings are included. FIG. 1 is a side cross-sectional view of the transmission and supporting framework taken along line 15 in FIG. 2.

FIG. 2 is a front cross-sectional view taken along line 15 in FIG. 1.

FIG. 7 is a cross-sectional prespective view of the housing unit, without the internal moving parts, taken along line 36 in FIG. 2.

FIG. 9 shows the stationary rotor of the motor pump without its supporting framework and two of the four vanes which fit into the four slots shown on the rotors face.

FIG. 10 shows the input shaft and the driven pump rotor and one of the four vanes which fit into the four slots shown on the rotors face.

FIG. 11 shows one of the two rotating end plates and its four slots which recieve the vanes when they are extended from the rotors.

FIG. 12 shows the dividing plate which fits between the two pump rotors.

FIG. 13 shows four fluid flow diagrams illustrating how the fluid circulates as the transmission operates.

FIG. 14 shows the control arm.

DESCRIPTION OF PREFERRED EMBODIMENT

This hydraulic transmission works with two rotary vane pumps which are both of variable capacities. Rotor #5, FIG. 10, is the driven pump rotor. It is fixed to the input shaft #34. The driven pump rotor #5 has four slots in it which are for the vanes #20, one of which is depicted separately in FIG. #10. Part #6 is the motor pump rotor. This rotor does not move but is directly fixed to the supporting frame-work #25 as shown in FIG. 1. This stationary rotor also has slots for four vanes, #20, two of which are shown separately in FIG. 9. FIG. 11 shows one of the rotating end plates #3. One rotating end plate, #3, is used in the driven pump and one rotating end plate, #3', is used in the motor pump. The rotating end plates have four slots in them as shown in FIG. 11. These slots recieve the vanes of their respective rotors. The pump rotors, #5 & #6, fit closely inside of their end plates and are able to slide axially inside of them. The vanes of the rotors are always engaged in the rotors and in the end plates so that they must rotate in unison with each other. Rotating end plate #3 is held in a slot in the housing unit next to the vane guide #29 in FIG. 7. This end plate is able to rotate within the housing unit and, working in conjunction with the vane guide #29, effectively seals off one end of the driven pump #5. Rotating end plate #3' is held in a slot in the housing unit next to the vane guide #27 in FIG. 7. This end plate does not rotate relative to the supporting framework but the housing unit does rotate around it. End plate #3' effectively seals off one end of the motor pump while working in conjunction with the vane guide #27. Rotors #5 & #6 are seperated by the seperating plate #4, FIG. 12. Its relative positon is shown in FIG. 1. The projecting part #22 of the seperating plate fits into the slot #22', Shown in FIG. 2. This keeps the seperating plate rotating in its proper position relative to the housing unit. Slot #22' also allows the housing unit to slide axially over the seperating plate. Also incorporated in the seperating plate are four holes #21. These holes facilitate the transfer of fluids between the two pumps as their capacities are being varied. Also in the seperating plate is an openning #24. This openning is supplied with hydraulic pressure from the pressure side of the pumps through the channel #23 shown in FIG. 12. This hydraulic pressure is utilized in forcing the vanes to extend properly from the rotors and make contact with the sides of the housing unit while in operation.

Fluid line #33, FIG. 1, allows the transfer of fluids between the back sides of the pumps as their capacities are being varied.

FIG. 14 shows the control arm #8 with its elementary fork which engages the throughout bearing #18 on the housing unit. It is held by the supporting framework as shown in FIG. 1. This control arm is used to move the housing unit #17 axially and there-by inversely vary the capacities of the pumps.

The output shaft is situated as part #19 on the housing unit. No gears or pullies are depicted as they could, of course, be placed anywhere on the housing unit.

Parts #31 are hydraulic seals. The entire housing unit is to be filled with hydraulic fluids, (no oil fill hole is shown).

The vane guides #26 & #30 give added support to the vanes when their respective pumps are at their minimum capacities.

The input shaft #34 extends through the rotor #5 and into the motor pumps rotor #6 for additional support only and turns freely in it.

The main purpose of the seperating plate #4 is to stop any loss of fluid pressure past the ends of the vanes while in operation.

OPERATION

The input shaft #34 drives the driven pump in a clockwise direction. The pumped fluids from the driven pump flow directly into the motor pump by flowing under the smaller part of the dividing plate and also under the center vane guide #28. These pumped fluids drive the housing of the motor pump, (which is the housing unit), in a clockwise direction.

The four flow diagrams in FIG. 13 are to illustrate how the pumped fluids move relative to the outside observer. The arrows on the front loops show the fluids moving in a clockwise motion. There are no arrows on the back loops because the fluids in the motor pump do not move relative to us. The space between where the two loops connect with each other represents where the fluids flow past the stop plate #31 and into the other pump. As the housing unit turns in a clockwise direction, so does the stop plate where the fluids are exchanged in the pumps.

When the seperating plate #4 is equally between the two end plates, #3 & $\pi 3'$, both pumps have equal capacities. In this case, when the drive shaft makes one revolution the housing unit will make one half a revolution. This is the same as a 2 to 1 drive ratio.

As the control arm #8 is moved to the right in FIG. 1, it moves the housing unit to the left and there-by increasing the capacity of the driven pump, as depicted in FIG. 1, while at the same time decreasing the capacity of the motor pump by an equal amount. This in effect raises the drive ratio closer to a 1 to 1 ratio. When the control arm is moved to its right limit it eliminates the capacity of the motor pump so that no pumping action can take place between the two pumps. When this occurs the housing unit is forced to turn in unison with the input shaft. This is the lock-up mode where-by the output shaft, (housing unit), turns with a 1 to 1 ratio with the input shaft. This is the same as high gear used in automobiles.

When the capacity of the driven pump is lowered below the capacity of the motor pump the drive ratio is lowered also below the 2 to 1 ratio.

When the capacity of the driven pump is ⅓ the capacity of the motor pump there will be a 4 to 1 drive ratio delivered to the output shaft with its subsequent 4 to 1 increase in torque power. This is similar to a low gear ratio of a standard automobile transmission.

When the capacity of the drive pump is reduced to zero the input shaft will be able to rotate freely without doing any pumping. This is similar to a neutral gear in an automobile transmission.

The drive ratios are thus continuously variable with the variable capacities of the pumps which are controlled by the manual control arm.

It should be understood that there are many ways of controlling the position of the housing unit, or in effect, controlling the drive ratios, including completely automatic means.

It will be obvious to those skilled in the art that many variations may be made in the embodiment of my invention without departing from the scope of my invention as defined in the following claims.

I claim:

1. A rotary pump and motor hydraulic transmission apparatus which comprises, in combination,
   (a) an input drive shaft supported by a stationary framework and being connected to the rotor of a rotary vane pump,
   (b) a stationary rotor of a rotary vane motor connected to said stationary supporting framework and axially facing the pump rotor,
   (c) a separating plate between the two rotors, said separating plate having a plurality of holes to allow the transfer of fluid between the pump chambers and the motor chambers and further a radially projecting part on the external periphery of the separating plate,
   (d) a rotating end plate for the pump which has radially-directed slots to support the vanes of the pump and a center hole which surrounds the pump rotor,
   (e) a rotating end plate for the motor which has radially-directed slots to support the vanes of the motor and a center hole which surrounds the motor rotor,
   (f) a rotating cylindrical housing unit, housing both pump and motor rotors, and which slides axially over the pump and motor rotors, and which has circumferential slots for the rotating end plates to fit into, and which has vane guides located proximate the rotating end plates for supporting the vanes when their respective motor and pump are at their minimum capacities, said rotating housing unit further having an axial slot on an internal surface for supporting the radially projecting part of said separating plate against relative rotational motion but permitting relative axial displacement, and further said housing unit having a projecting sleve surrounding the input shaft for use as the output shaft, and
   (g) means for axially displacing the rotating cylindrical housing unit relative to the pump and motor rotors to change the capacities of the pump and motor chambers to vary the drive ratio between the input and the output shaft.

* * * * *

UNITED STATES PATENT AND TRADEMARK OFFICE
CERTIFICATE OF CORRECTION

PATENT NO. : 4,646,521

DATED : Mar. 3, 1987

INVENTOR(S) : Snyder

It is certified that error appears in the above-identified patent and that said Letters Patent is hereby corrected as shown below:

Column 1:

BRIEF DESCRIPTION OF DRAWINGS

Two sheets of drawings are included. FIG. 1 is a side cross-sectional view taken along line 15 in FIG. 2.
FIG. 2 is a front cross-sectional view taken along line 16 in FIG. 1.
FIG. 3 is a cross-sectional prespective view of the housing unit, without the internal moving parts, taken along line 36 in FIG. 2.

Column 2:

FIG. 4 shows the stationary rotor of the motor without its supporting framework and one of the four vanes which fit into the four slots shown on the rotor's face.
FIG. 5 shows the input shaft and the driven pump rotor and one of the four vanes which fit into the four slots shown on the rotor's face.
FIG. 6 shows one of the two rotating end plates and its four slots which recieve the vanes when they are extended from the rotors.
FIG. 7 shows the dividing plate which fits between the two rotors.
FIG. 8 shows four fluid flow diagrams illustrating how the fluid circulates as the tranmission operates.
FIG. 9 shows the control arm.

DESCRIPTION OF PREFERRED EMBODIMENT

This hydraulic transmission works with two rotary vane devices whichare both of variable capacities. Rotor #5, FIG. 5, is the driven pump rotor. It is fixed to the input shaft #34. The driven pump rotor #5 has four slots in it which are for the vanes #20, one of which is depicted separately in FIG. 5.

UNITED STATES PATENT AND TRADEMARK OFFICE
CERTIFICATE OF CORRECTION

PATENT NO. : 4,646,521

DATED : Mar. 3, 1987

INVENTOR(S) : Snyder

Page 2 of 4

It is certified that error appears in the above-identified patent and that said Letters Patent is hereby corrected as shown below:

Remainder of column 2

Part #6 is the motor rotor. This rotor does not move out is directly fixed to the supporting framework #25 as shown in FIG. 1. This stationary rotor also has slots for four vanes, #20, one of which is shown in FIG. 4. FIG. 6 shows one of the rotating end plates, #3. One rotating end plate, #3, is used in the driven pump and one rotating end plate, #3', is used in the motor. The rotating end plates have four slots in them as shown in FIG. 6. These slots recieve the vanes of their respective rotors. The rotors,#5 & #6, fit closely inside of their end plates and are able to slide axially inside of them. The vanes of the rotors are always engaged in the rotors and in the end plates so that they must rotate in unison with each other. Rotating end plate #3 is held in a slot in the housing unit next to the vane guide #29 in FIG.3. This end plate is able to rotate within the housing unit and, working in conjunction with the vane guide #29, effectively seals off one end of the driven pump #5. Rotating end plate #3' is held in a slot in the housing unit next to the vane guide #27 in FIG. 3. This end plate does not rotate relative to the supporting framework but the housing unit does rotate around it. End plate #3' effectively seals off one end of the motor while working in conjunction with the vane guide #27. Rotors #5 & #6 are seperated by the seperating plate #4, FIG. 7. Its relative position is shown in FIG. 1. The projecting part #22 of the seperating plate fits into the slot #22', shown in FIG. 2. This keeps the seperating plate rotating in its proper position relative to the housing unit. Slot #22' also allows the housing unit to slide axially over the seperating plate. Also incorporated in the seperating plate are four holes #21. These holes facilitate the transfer of fluids between the pump and motor as their capacities are being varied. Also in the seperating plate is an openning #24. This openning is supplied with hydraulic pressure from the pressure side of the pump through the channel #23, FIG. 7.

UNITED STATES PATENT AND TRADEMARK OFFICE
CERTIFICATE OF CORRECTION

PATENT NO. : 4,646,521

DATED : Mar. 3, 1987

INVENTOR(S) : Snyder

It is certified that error appears in the above-identified patent and that said Letters Patent is hereby corrected as shown below:

Remainder of column 2 plus some of column 3:

This hydraulic pressure is utilized in forcing the vanes to extend properly from the rotors and make contact with the sides of the housing unit while in operation.
  Fluid line #33, FIG. 1, allows the transfer of fluids between the back sides of the pump and motor as their capacities are being varied.

Column 3:

FIG.9 shows the control arm #8 with its elementary fork which engages the throwout bearing #18 on the housing unit. It is held by the supporting framework as shown in FIG. 1. This control arm is used to move the housing unit #17 axially and there-by inversely vary the capacities of the pump and motor.
  The output shaft is situated as part #19 on the housing unit. No gears or belts are depicted as they could, of course, be placed anywhere on the housing unit.
  Parts #31 are hydraulic seals. The entire housing unit is to be filled with hydraulic fluids, (no oil fill hole is shown).
  The vane guides #26 & #30 give added support to the vanes when their respective motor and pump are at their minimum capacities.
  The input shaft #34 extends through the rotor #5 and into the motor rotor #6 for additional support only and turns freely in it.
  The main purpose of the seperating plate #4 is to stop any cerculation of fluids past the ends of the vanes while in operation.
COLUMN 3, LINE 38:

UNITED STATES PATENT AND TRADEMARK OFFICE
CERTIFICATE OF CORRECTION

PATENT NO. : 4,646,521

DATED : March 3, 1987

INVENTOR(S) : Snyder

It is certified that error appears in the above-identified patent and that said Letters Patent is hereby corrected as shown below:

fluids flow past the stop plate #32 and into the other

Signed and Sealed this

Eighteenth Day of August, 1987

Attest:

DONALD J. QUIGG

Attesting Officer Commissioner of Patents and Trademarks